US012365365B2

(12) United States Patent
Zhao et al.

(10) Patent No.: US 12,365,365 B2
(45) Date of Patent: Jul. 22, 2025

(54) METHOD, COMPUTER SYSTEM AND NON-TRANSITORY COMPUTER READABLE MEDIUM FOR TARGET SELECTION IN THE VICINITY OF A VEHICLE

(71) Applicant: Aptiv Technologies AG, Schaffhausen (CH)

(72) Inventors: Kun Zhao, Düsseldorf (DE); Maximilian Schaefer, Wuppertal (DE); Markus Buehren, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 254 days.

(21) Appl. No.: 18/155,496

(22) Filed: Jan. 17, 2023

(65) Prior Publication Data
US 2023/0242159 A1    Aug. 3, 2023

(30) Foreign Application Priority Data

Jan. 28, 2022  (EP) ..................................... 22153827
Jan. 17, 2023  (EP) ..................................... 23151911

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/404* (2020.02); *B60W 2554/80* (2020.02)

(58) Field of Classification Search
CPC ............. B60W 60/0027; B60W 40/04; B60W 2554/404; B60W 2554/80;
(Continued)

(56) References Cited

U.S. PATENT DOCUMENTS

| 11,851,081 B2 * | 12/2023 | Refaat ................. B60W 60/001 |
| 2014/0050406 A1 * | 2/2014 | Buehler .................... G06T 7/20 382/191 |
| 2022/0161830 A1 * | 5/2022 | Devassy ........... B60W 50/0097 |

FOREIGN PATENT DOCUMENTS

| DE | 102010033776 | 5/2011 |
| DE | 102012009297 | 12/2012 |

(Continued)

OTHER PUBLICATIONS

"Extended European Search Report", EP Application No. 22153827.5, Jul. 26, 2022, 9 pages.
(Continued)

*Primary Examiner* — James J Lee
*Assistant Examiner* — Elizabeth Galyn Martinez
(74) *Attorney, Agent, or Firm* — Harness, Dickey & Pierce, P.L.C.

(57) ABSTRACT

Computer implemented method for target selection in the vicinity of a vehicle, comprising obtaining vehicle state information, the vehicle state information comprising dynamic information regarding the vehicle, predicting a first trajectory of the vehicle based on the vehicle state information for a first prediction time horizon, detecting road users in the vicinity of the vehicle, determining state information from the detected road users, the state information comprising dynamic information regarding the road users, predicting a second trajectory of the vehicle based on the vehicle state information and the road users state information for the first prediction time horizon and performing a first similarity comparison of the first predicted trajectory and the second predicted trajectory of the vehicle to determine whether the detected road users are a potential target of the vehicle for the first prediction time horizon.

15 Claims, 8 Drawing Sheets

(58) Field of Classification Search
CPC ....... B60W 2520/10; B60W 2520/105; B60W 2540/10; B60W 2540/12; B60W 2540/18; B60W 2552/50; B60W 2552/53; B60W 2554/4041; B60W 2554/4042; B60W 2556/50; B60W 30/0956; B60W 30/0953
See application file for complete search history.

(56) References Cited

FOREIGN PATENT DOCUMENTS

| | | |
|---|---|---|
| DE | 102018210065 | 12/2018 |
| EP | 3495219 | 6/2019 |
| EP | 3916697 | 12/2021 |

OTHER PUBLICATIONS

Schafer, et al., "Context-Aware Scene Prediction Network (CASPNet)", Jan. 18, 2022, 9 pages.
Schafer, et al., "Context-Aware Scene Prediction Network (CASPNet)", 2022 IEEE 25th International Conference on Intelligent Transportation Systems (ITSC), Oct. 8, 2022, 8 pages.

* cited by examiner

METHOD, COMPUTER SYSTEM AND NON-TRANSITORY COMPUTER READABLE MEDIUM FOR TARGET SELECTION IN THE VICINITY OF A VEHICLE

INCORPORATION BY REFERENCE

This application claims priority to European Patent Application No. EP23151911.7, filed Jan. 17, 2023, and European Patent Application No. EP22153827.5, filed Jan. 28, 2022, the disclosures of which are incorporated by reference in their entireties.

FIELD

The present disclosure relates to a method, a computer system and a non-transitory computer readable medium for target selection in the vicinity of a vehicle, in particular in a vehicle with advanced driver assistance systems and/or an autonomously driving vehicle.

BACKGROUND

Driving of a vehicle involves constant interaction with other road users. Advanced driver assistance system (ADAS) features or autonomous driving features of modern vehicles rely on the perception of these road users to adapt their own control parameters such as adaptive cruise control (ACC), automatic emergency breaking (AEB)), to issue a warning (e.g. lateral collision warning (LCW), and/or for path planning for its own autonomous driving (AD).

Target selection is traditionally a rule-based system and requires different rules for different applications. For example, an ACC system may adapt the speed of a vehicle according to be a target leading vehicle, selected from a perceived road user. An autonomous driving system may require to take into account various potential driving behaviors of road users and accordingly select appropriate targets to ensure safe interaction with other users. However, selecting appropriate targets is computationally intensive.

Accordingly, there is a need for an improved approach for target selection of road users.

SUMMARY

The present disclosure provides a computer implemented method, a computer system and a non-transitory computer readable medium, including those described in the independent claims. Embodiments are given in the claims, the subclaims, the description and the drawings.

In one aspect, the present disclosure is directed at a computer implemented method for target selection in the vicinity of a vehicle. The method comprises, in a first step, to obtain vehicle state information. Therein, the vehicle state information comprises dynamic information regarding the vehicle. The method comprises, in a further step, to predict a first trajectory of the vehicle based on the vehicle state information for a first prediction time horizon. The method comprises, in another step, to detect, road users in the vicinity of the vehicle. The method comprises, in a further step, to determine state information from the detected road users. Therein, the state information comprises dynamic information regarding the road users. The method comprises, in a further step, to predict a second trajectory of the vehicle based on the road users state information and on the vehicle state information for the first prediction time horizon. The method comprises, in another step, to perform a first similarity comparison of the first predicted trajectory and the second predicted trajectory to determine whether the detected road users are a potential target of the vehicle for the first prediction time horizon.

The vehicle may be a vehicle that has autonomous driving (AD) features or a vehicle with an advanced driving assistance system (ADAS). The vehicle state information comprises dynamic information regarding the vehicle. Dynamic in this context means changing information and/or information related to a dynamic, i.e. moving context. In particular, the vehicle state information may comprise information regarding the position, the steering angle, the throttle and/or brake input, the acceleration and/or the velocity of the vehicle, a turning signal status, AD and/or ADAS feature status and/or a current navigation route. This information may be obtained from suitable sensors, such as, for example, odometry sensors being integrated into the vehicle. The vehicle state information may in particular comprise vehicle state information from the past.

Therein, in the method, the vehicle state information is processed to predict a first trajectory of the vehicle for a first prediction time horizon. A prediction time horizon is a given point of time in the future for which the prediction is carried out. The first trajectory that is predicted based on the vehicle state information is in particular a future trajectory of the vehicle, i.e. a path that the vehicle may take in the future considering only the vehicle itself. In particular, the first trajectory is predicted only based on the vehicle state information.

In a further step, road users in the vicinity of the vehicle are detected. This may be performed by a sensor, such as, for example, one or more image sensors, in particular one or more radar, lidar and/or camera sensors being integrated into the vehicle.

The road users state information, similarly, comprises dynamic information regarding the road users. In particular, the state information from the road users may comprise information regarding the position, the acceleration and/or the velocity of other road users, different from the vehicle. A road user is, for example, another vehicle, a motorbike or a truck using the same road and/or being positioned in the vicinity of the vehicle. The entirety of road users may comprise at least one other road user or multiple other road users. The road users state information may in particular comprise road users state information from the past, in particular from earlier and/or previous prediction time horizons.

The road users state information is then processed together with the vehicle state information. Thereby, a second trajectory of the vehicle can be predicted for the same first prediction time horizon. The second trajectory that is predicted based on the road users state information and the vehicle state information is in particular a future trajectory of the vehicle dependent on the other road users, i.e. a path that the vehicle may take in the future when considering the other road users as a whole and the vehicle itself.

Then, a first similarity comparison is carried out by comparing the first predicted trajectory of the vehicle, which is based on the vehicle state information, and the second predicted trajectory of the vehicle, which is based on the road users state information and the vehicle state information. Thereby, it is determined whether the road users are a potential target of the vehicle for the first prediction time horizon. A target is a road user that may have significant impact on the vehicle's future driving trajectory. In particular, if the similarity comparison yields a similarity below a predetermined threshold, the road user is considered a potential target. On the other hand, if the similarity comparison yields a similarity greater than a predetermined threshold, the road user is not considered a potential target and may be discarded.

In other words, the first predicted trajectory, considering the vehicle only, is compared with the second predicted trajectory, considering the vehicle and at least one other road user, and, if these two trajectories are similar to a certain extent, i.e. their similarity is a above a certain threshold, there is no significant difference between the two trajectories, whereby the other road user is not considered a potential target. If these two trajectories differ from each other to a certain extent, i.e. their similarity is below a certain threshold, there is a significant difference between the two trajectories, whereby the other road user is considered a potential target.

According to an embodiment, the vehicle state information further comprises static information regarding the vehicle. Alternatively, or additionally, the state information from road users comprises static information regarding the road users.

Static in this context means unchanging information and/or information related to a static, i.e. non-moving context. In particular, static in this context means context that restricts the maneuver of the vehicle itself and/or of the particular road users or road user. As an example, the vehicle state information may comprise information regarding the position of buildings, roads or other non-moving structures in the vicinity of the vehicle, such as the lane structure, a curb and/or guardrails. Additionally, or alternatively, the vehicle state information may comprise information regarding traffic rules, speed limitations, lane directions and/or traffic lights relevant for the vehicle.

Similarly, the state information from road users may comprise information regarding the position of buildings, roads or other non-moving structures in the vicinity of the particular road users or road user, such as the lane structure, a curb and/or guardrails. Additionally, or alternatively, the vehicle state information may comprise information regarding traffic rules, speed limitations, lane directions and/or traffic lights relevant for the particular road users or road user.

The static information may be derived from map data and/or perceptions sensors, such as a camera-based traffic light detection, traffic sign detection and/or lane marking detection.

According to an embodiment, the step of performing the first similarity comparison of the first predicted trajectory of the vehicle based on the vehicle state information and the second predicted trajectory of the vehicle based the road users state information and the vehicle state information is used to determine a relevance threshold of the road users for the first prediction time horizon.

A relevance threshold is a threshold, above which other road users are considered a target and below which other road users are not considered a target for the vehicle. In particular, by considering all road users, an individual threshold can be determined for any given situation.

Thereby, road users that are not relevant for target determination are not considered and computing power can be reduced.

According to an embodiment, the road users comprise a first road user. Therein, the step of determining state information from the detected road users comprises determining state information from the first road user. The method further comprises to predict a third trajectory of the vehicle based on the first road user state information and the vehicle state information for the first prediction time horizon and to perform a second similarity comparison of the second predicted trajectory of the vehicle, which is based on the road users state information and the vehicle state information, and the third predicted trajectory of the vehicle, which is based on the first road user state information and the vehicle state information, to determine whether the first road user is a potential target of the vehicle for the first prediction time horizon based on the relevance threshold.

The state information from the first road user may comprise dynamic and/or static information as described above regarding an individual first road user out of all road users.

According to an embodiment, the road users comprise a second road user. Therein, the step of determining state information from the detected road users comprises determining state information from the second road user. The method further comprises to predict a fourth trajectory of the vehicle based on the second road user state information and the vehicle state information for the first prediction time horizon and to perform a third similarity comparison of the fourth predicted trajectory of the vehicle, which is based on the second road user state information and the vehicle state information, and the second predicted trajectory of the vehicle, which is based on the road users state information and the vehicle state information, to determine whether the second road user is a potential target of the vehicle for the first prediction time horizon based on the relevance threshold.

Likewise, the state information from the second road user may comprise dynamic and/or static information as described above regarding an individual second road user out of all road users.

Therein, the first road user is different from the second road user and both are different from the vehicle.

Thereby, the road users may be ranked based on their impact on the vehicle.

According to an embodiment, the steps of the method are repeated for a second prediction time horizon different from the first prediction time horizon.

In particular, the steps may be repeated for a second prediction time horizon after concluding all the steps for the first prediction time horizon, i.e. sequentially. In another embodiment, the steps are processed in parallel for a first and a second prediction time horizon.

The second prediction time horizon is another point in time in the future for which the prediction is carried out, in particular, a point in time further in the future as the first prediction time horizon.

Thereby, a particular robust target determination can be achieved.

According to an embodiment, the similarity comparison comprises to perform a distance metric.

According to an embodiment, the distance metric comprises performing at least one of a Wasserstein, an L1, an L2 or a Mahalanobis algorithm.

According to an embodiment, the predictions are performed by a machine-learning algorithm. In particular, the prediction of the first trajectory, the second trajectory, the third trajectory and/or the fourth trajectory may be performed by using a machine-learning algorithm.

The machine-learning algorithm may be in particular a context-aware scene prediction algorithm. In particular, the machine-learning algorithm may be a multi-modal prediction algorithm based on machine-learning. Further, the machine-learning algorithm may use a convolutional neural network and/or a recurrent neural network, which may be used in particular together to jointly learn and predict the motion of one or more road users.

In particular, for the prediction of a given scene of road users, the future motion of one or more road users in a region of interest is predicted. The number of road users may vary from scene to scene which leads to the requirement of storing a variable number of road users in a shared data structure. As input and output data structure, a series of fixed-size 2D grids, which may also be referred to as images, is used, which allows the algorithm to jointly encode the trajectories of one or more road users in a region of interest and support the prediction of the road users.

The predictions may be performed as described in Maximilian Schaefer et al.: "Context-Aware Scene Prediction Network (CASPNet)", https://arxiv.org/abs/2201.06933, the entire contents of which is incorporated herein by reference.

Likewise, the prediction may be performed as described in M. Schäfer, K. Zhao, M. Bühren and A. Kummert, "Context-Aware Scene Prediction Network (CASPNet)," 2022 *IEEE 25th International Conference on Intelligent Transportation Systems (ITSC)*, Macau, China, 2022, pp. 3970-3977, doi: 10.1109/ITSC55140.2022.9921850, the entire contents of which is incorporated herein by reference.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a vehicle, comprising a computer system as described above.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Example embodiments and functions of the present disclosure are described herein in conjunction with the following drawings, showing schematically.

DETAILED DESCRIPTION

Figure 1:
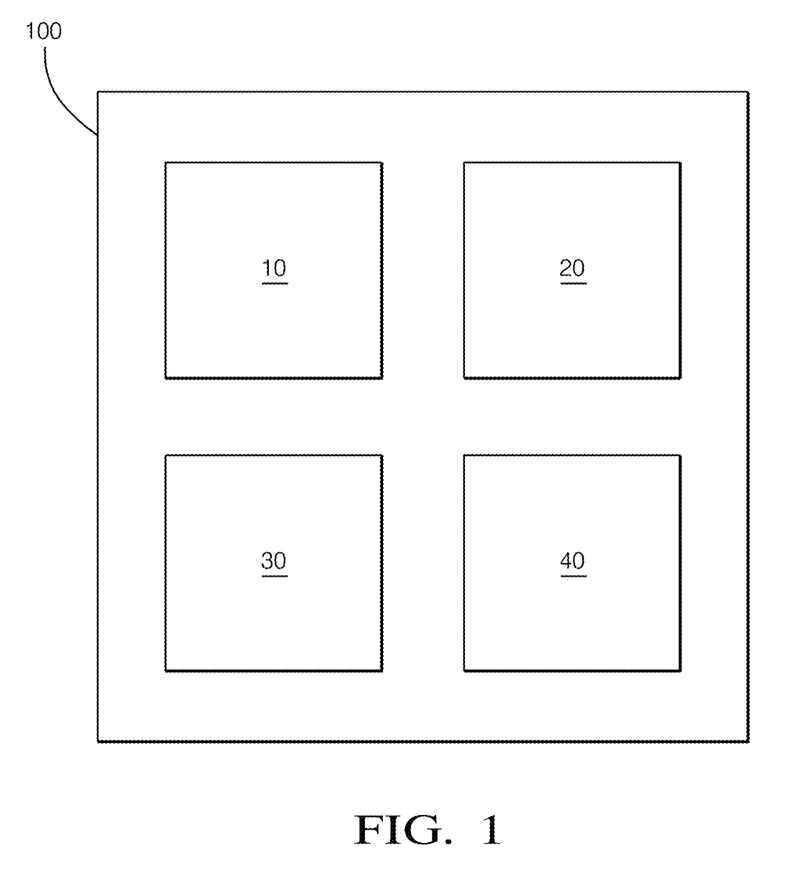
FIG. 1 illustrates a system for target selection in the vicinity of a vehicle.

FIG. 1 depicts a system 100 for target selection in the vicinity of a vehicle. The system 100 comprises a processor 10, a memory 20, an odometry sensor 30 and an image sensor 40.

The system 100 is adapted to obtain, by means of the processor 10, vehicle state information. Therein, the vehicle state information comprises dynamic and static information regarding the vehicle. The dynamic vehicle state information are obtained by means of the odometry sensor 30 and the static vehicle state information are obtained by means of the processor from data stored in the memory 20.

The system 100 is further adapted to perform, by means of the processor 10, a machine-learning algorithm to predict a first trajectory of the vehicle based on the vehicle state information for a first prediction time horizon.

The system 100 is further adapted to detect, by means of the image sensor 40, road users in the vicinity of the vehicle. The system 100 is further adapted to determine, by means of the processor 10, state information from the detected road users, which are different from the vehicle. Therein, the state information comprises dynamic and static information regarding the road users.

The system 100 is further adapted to perform, by means of the processor 10, a machine-learning algorithm on the road users state information and the vehicle state information to predict a second trajectory of the vehicle for the first prediction time horizon.

The system 100 is further adapted to perform, by means of the processor 10, a first similarity comparison of the first predicted trajectory of the vehicle, based on the vehicle state information, and the second predicted trajectory of the vehicle, based on the road users state information and the vehicle state information, to determine whether the road users are a potential target of the vehicle for the first prediction time horizon.

Therein, the step of performing, by the processor 10, the first similarity comparison of the first predicted trajectory of the vehicle based on the vehicle state information and the second predicted trajectory of the vehicle based the road users state information and the vehicle state information is used to determine a relevance threshold of the detected road users for the first prediction time horizon.

Therein, the road users comprise a first road user and the step of determining state information from road users comprises determining state information from the first road user. Therein, the system 100 is further adapted to perform, by means of the processor 10, a machine-learning algorithm on the first road user state information and the vehicle state information to predict a third trajectory of the vehicle for the first prediction time horizon and to perform, by means of the processor 10, a second similarity comparison of the predicted trajectory of the vehicle based on the second predicted trajectory of the vehicle based on the road users state information and the vehicle state information and the third predicted trajectory of the vehicle based on the first road user state information and the vehicle state information to determine whether the first road user is a potential target of the vehicle for the first prediction time horizon based on the relevance threshold.

Further, the road users comprise a second road user, wherein the step of determining state information from road users comprises determining state information from the second road user. Therein, the system 100 is further adapted to perform, by means of the processor 10, a machine-learning algorithm on the second road user state information and the vehicle state information to predict a fourth trajectory of the vehicle for the first prediction time horizon, and to perform, by means of the processor 10, a third similarity comparison of the fourth predicted trajectory of the vehicle based on the second road user state information and the vehicle state information and the second predicted trajectory of the vehicle based on the road users state information and the vehicle state information to determine whether the second road user is a potential target of the vehicle for the first prediction time horizon based on the relevance threshold.

The system 100 is further adapted to determine whether the first road user or the second road user has a higher priority based on the second similarity comparison and the third similarity comparison.

The system 100 is further adapted to repeat, by means of the processor 10, the previously described steps for a second prediction time horizon different from the first prediction time horizon.

The system 100 is further adapted to perform a distance metric, which may comprise at least one of a Wasserstein, an L1, an L2 or a Mahalanobis algorithm.

In particular, the system 100 will now be described exemplarily with respect to individual features that may be underlying the system 100:

A human driver's driving trajectory is affected by its own dynamic and its surrounding context, which consists of other road users (dynamic context) and the static environment or context. Given the vehicle's past dynamic state x, all N other road users' past dynamic state $x_1, x_2, \ldots, x_n$, the static information of the scene as c, the future trajectory of the vehicle $y_t$ at future prediction time horizon t can be defined as the conditional distribution:

$$P(y_t|x,x_1,x_2,\ldots,x_n,c) \quad (1)$$

In particular, the intention, as a thought of the human, of where the driver wants to go cannot be observed from sensors. For example, in front of an intersection, the driver may go left, or right, or straight, its trajectory may be affected by its context, but the most important factor is where does the driver want to go.

This factor is non-observable. Thus, the predicted distribution for $y_t$ has to be multi-modal, to cover the multiple possible true future trajectories. Depending on where the driver may want to go, the targets may also be different.

Therein, the vehicle's future trajectory based on a single road user $x_i$'s impact can be formulated as a conditional distribution $P_i$ $$P_i(t_t|x,x_i,c), \quad (2)$$

Similar, the distribution $P_0$ describes the trajectory distribution when no dynamic context (no other road users) are taken into consideration for the prediction of $y_t$ $$P_0(t_t|x,c) \quad (3)$$

Assume there is a distance function L, which measures the distance d between two distributions. For example, between distributions (1) and (2)

$$d_i=L(P,P_i) \quad (4)$$

Also, with and without dynamic context the predicted distribution's distance can be calculated as $$d_0=L(P,P_0) \quad (5)$$

Fundamentally, a small distance means similar predictions distribution, and great distance indicates different distributions.

Given the above equations and definitions, the system 100 for target selection may be described as the following procedure:
1. At each prediction time horizon,
   a. Predict the distribution P, $P_i$ i∈[1, 2, ..., N] and $P_0$ using the machine-learning algorithm.
   b. Check whether the dynamic context plays a role for prediction at all by calculating the distance $d_0$=L(P, $P_0(t_t|x, c)$).
   c. Loop through all the road users, for each road user $x_i$ calculate its distance to distribution P:

$$d_i=L(P,P_i)$$

d. Keep the road users, whose distance to P is smaller than $d_0$.
   e. The road user with the smallest distance means it has most significant impact on vehicle's driving.
2. Repeat above step for all the prediction time horizons, to select the most relevant targets (if there are any) for each prediction time horizon.

Thereby, a machine-learning-based, context-aware trajectory prediction system is used to test which road user has the most significant impact on the vehicle's future trajectory, by comparing the predictions between fully context-aware and with only one road user as dynamic context. In addition, whether the road users (dynamic context) plays has an impact at all is also tested.

Figure 2:
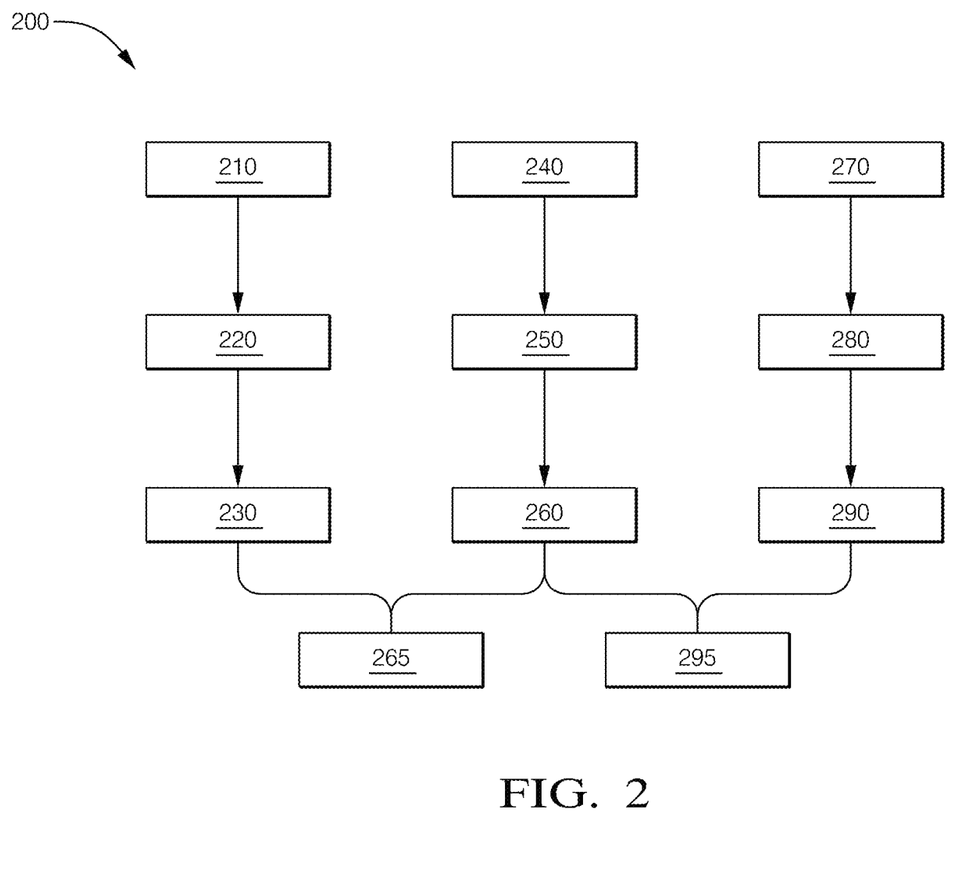
FIG. 2 illustrates a flow chart of a method for target selection in the vicinity of a vehicle.

This will now be described in further detail with respect to FIG. 2, which shows a flow chart of a method 200 for target selection in the vicinity of a vehicle.

In step 210, the method 200 obtains vehicle state information.

In step 220 then a machine-learning algorithm is performed to predict a first trajectory of the vehicle based on the vehicle state information for a first prediction time horizon.

The prediction is put out in step 230.

In step 240, state information from road users different from the vehicle are obtained.

In step 250 a machine-learning algorithm is performed on the road users state information and the vehicle state information to predict a second trajectory of vehicle for the first prediction time horizon.

The prediction is put out in step 260.

Then, in step 265, a first similarity comparison is performed based on the first predicted trajectory of the vehicle as put out in step 230 and the second predicted trajectory of the vehicle as put out in step 260 to determine whether the road users are a potential target of the vehicle for the first prediction time horizon.

In step 270, state information from only one road user, i.e. a first road user, is used as input together with the vehicle state information, on which the machine-learning algorithm is performed in step 280 to predict a third trajectory of the vehicle for the first prediction time horizon, which is put out at 290.

Then, in step 295, a second similarity comparison is performed based on the second predicted trajectory of the vehicle as put out in step 260 and the third predicted trajectory of the vehicle as put out in step 290 to determine whether the one road user is a potential target of the vehicle for the first prediction time horizon.

This is done based on a relevance threshold previously determined based on first similarity comparison of step 265.

These last four steps 270, 280, 290 and 295 may then be repeated based on state information of another one of the road users, i.e. a second, a third and/or a fourth road user together with the vehicle state information to perform a third and/or a fourth similarity comparison.

Similarly, the method 200 may be repeated for a second prediction time horizon, a third time horizon, a fourth time horizon, etc., either sequentially or in parallel.

Through the above-described system 100 and method 200 it is possible to provide a general target selection framework, which works regardless of highway/urban, road structures and driving scenarios as well as regardless of the complexity of the scene.

In particular, through the above-described embodiments, a data-driven approach is provided that learned from real world user driving, wherein no specific rules need to be explicitly defined, which mimics a realistic decision of the user.

The target determination convers the various possible driving behaviors of the user, which considers multi-modality. Thereby, the target determination is independent of the application and further provides flexibility for different target determinations depending on different prediction time horizons.

FIGS. 3A, 3B, 3C, 3D, 3E, and 3F show an exemplary outcome of the method for target selection in the vicinity of a vehicle 1000 as described in conjunction with FIG. 2.

Therein, a multi-lane intersection 1001 is shown for a first prediction horizon 1100 at 0.5 s in the future, a second prediction horizon 1200 at 1.0 s in the future, a third prediction horizon 1300 at 1.5 s in the future, a fourth prediction horizon 1400 at 2.0 s in the future, a fifth prediction horizon 1500 at 2.5 s in the future and a sixth prediction horizon 1600 at 3.0 s in the future.

Figure 3A:
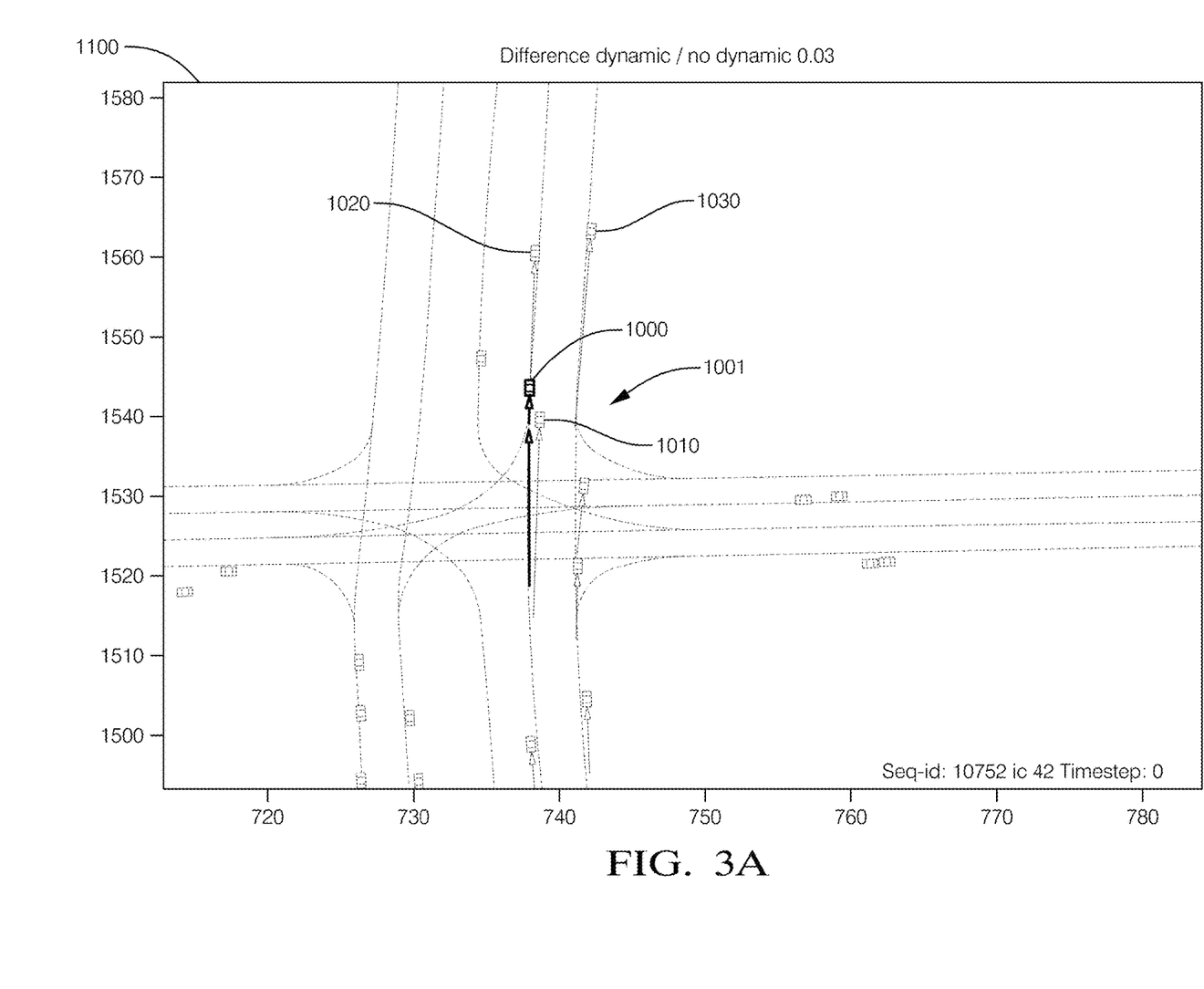
FIGS. 3A, 3B, 3C, 3D, 3E, and 3F illustrate an example outcome of the method for target selection in the vicinity of a vehicle.

Therein, the vehicle 1000, on which the method for target selection is performed, is shown in the center of the individual prediction horizon. In the first prediction horizon 1100 none of the other road users are a potential target of the vehicle. This is due to the short future that is predicted in the first prediction horizon 1100.

Figure 3B:
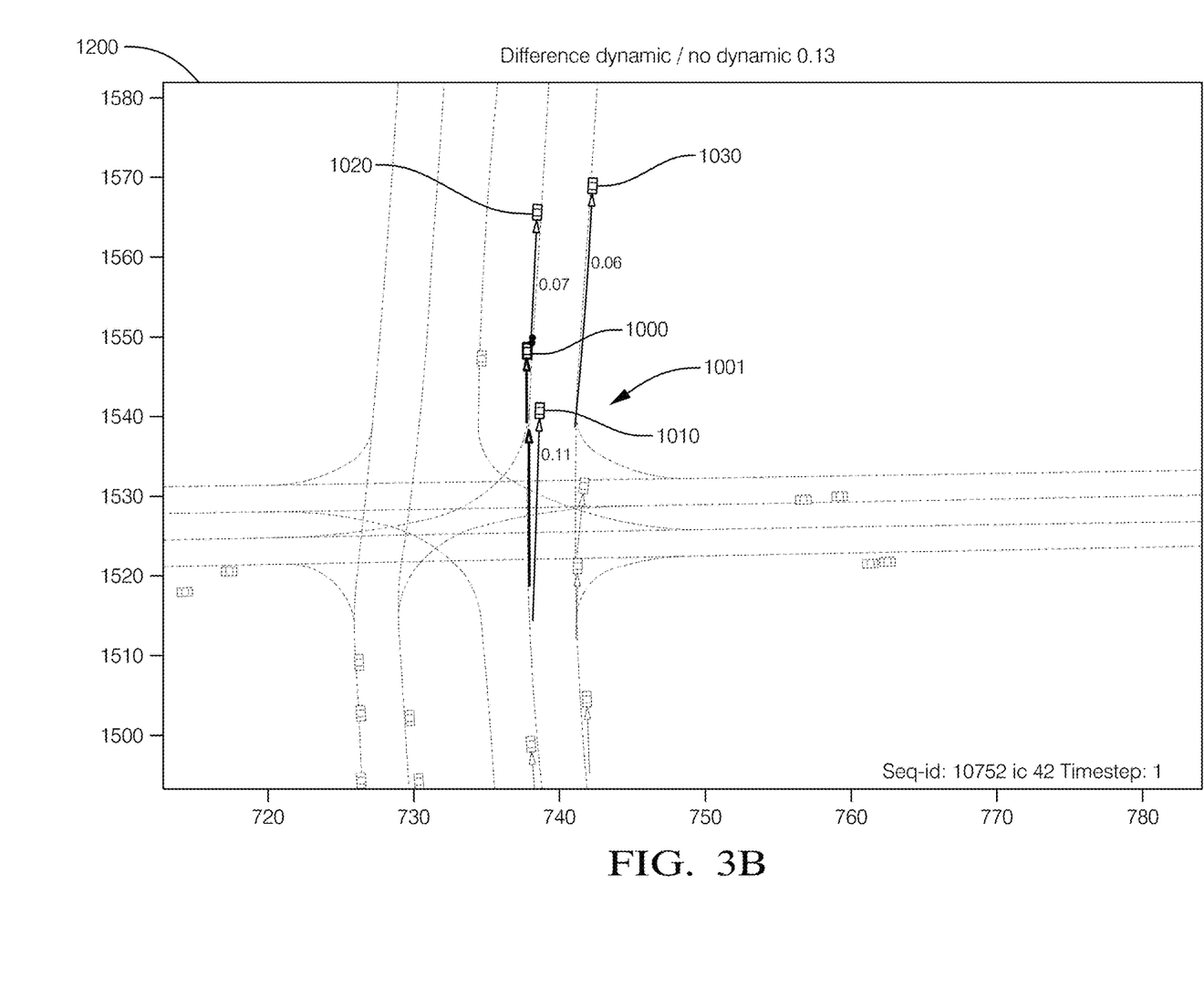

In the second prediction horizon 1200, out of the multiple road users, four road users have been identified as potential targets of the vehicle 1000, i.e. a first road user 1010, a second road user 1020 and a third road user 1030. The other road users, which are not shown with a reference numeral, have been identified as not relevant or below a previously determined relevance threshold.

Therein, a smaller number for the respective road user indicates a higher relevance. As can be seen in the second prediction horizon 1200, the method has identified the third road user 1030 as most relevant, the second road user 1020 as less relevant and the first road user 1010 as least relevant.

Figure 3C:
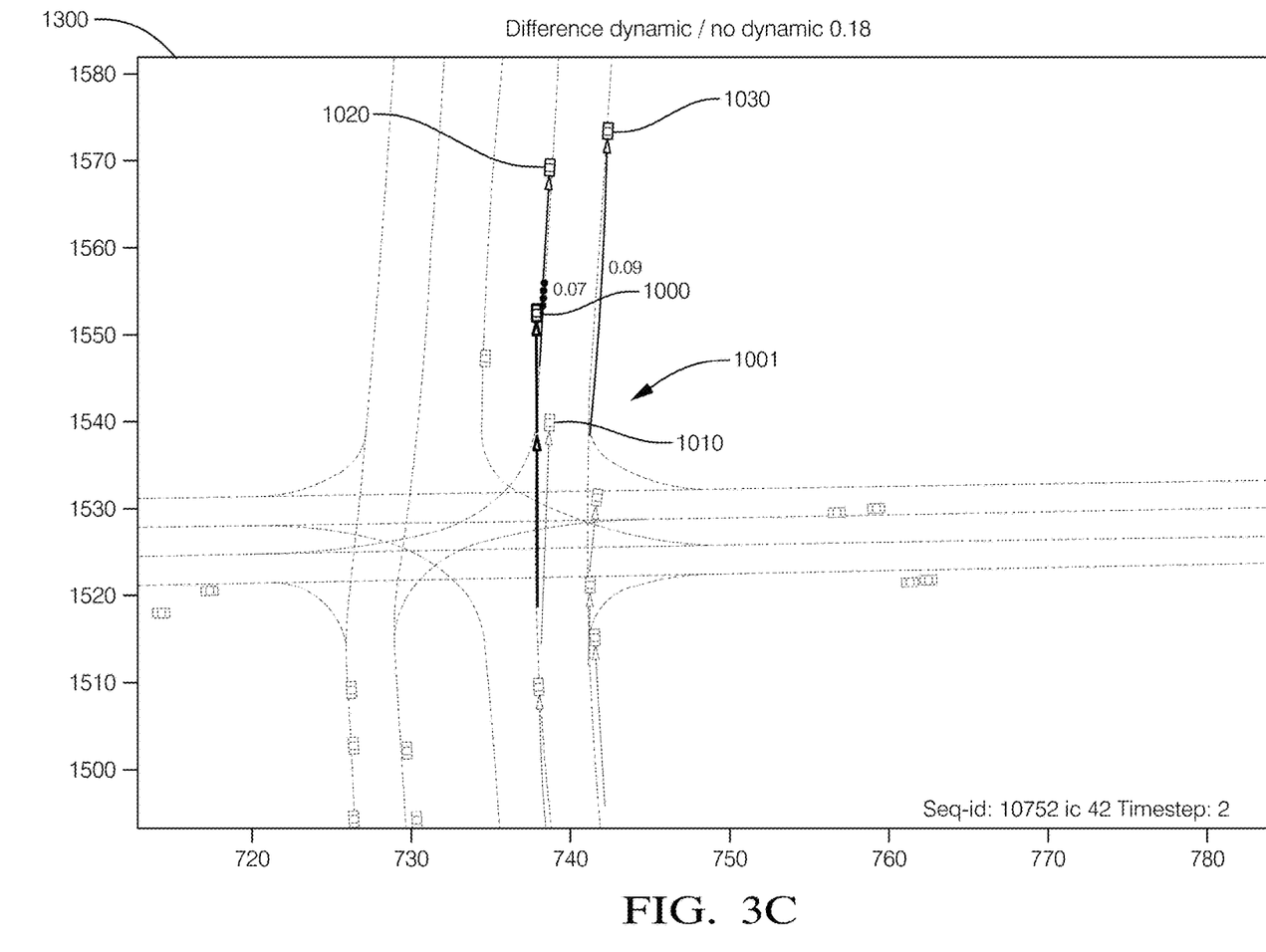
Figure 3D:
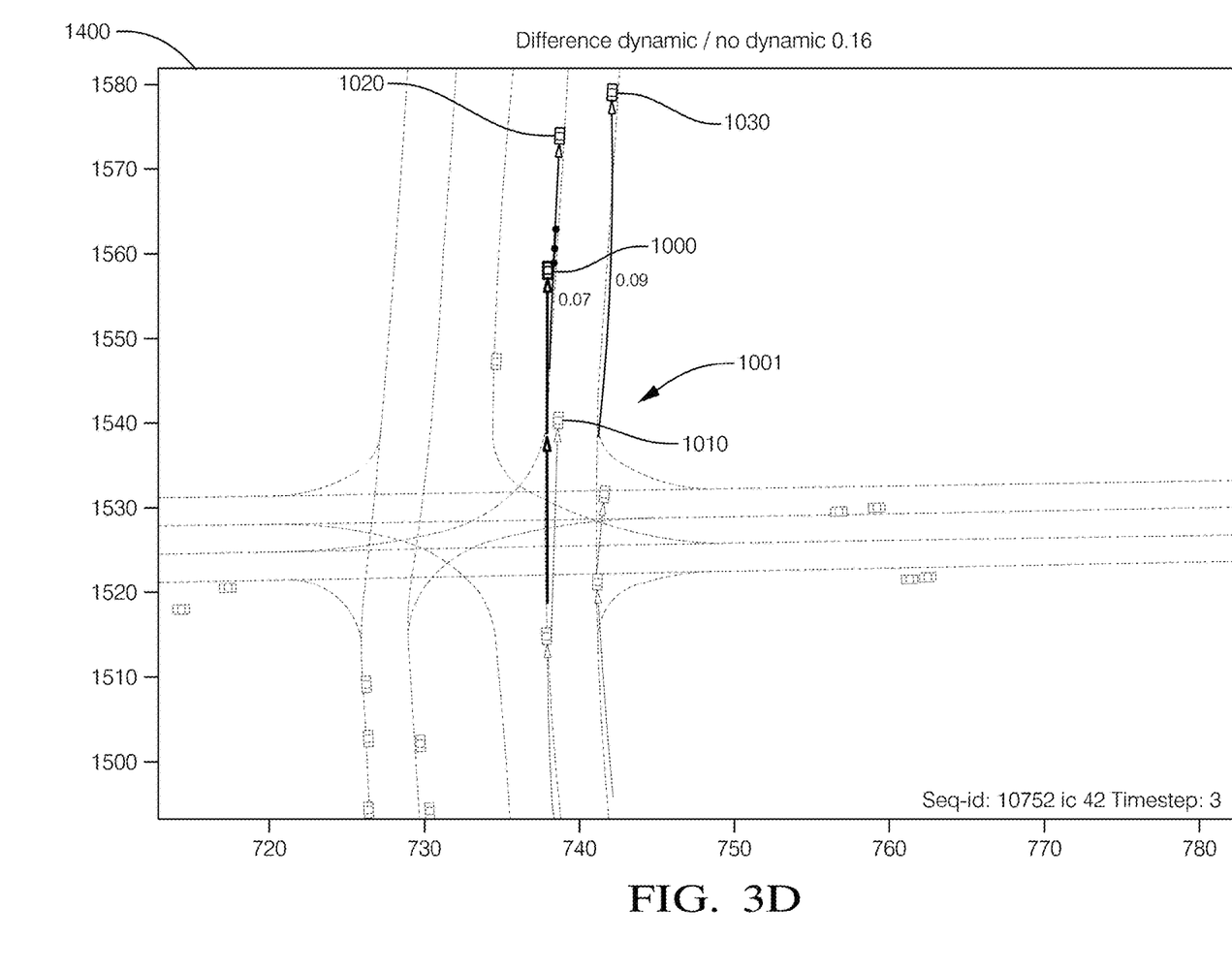

However, as can be seen from the third prediction horizon 1300, the first road user 1010 has not been identified as relevant any longer, wherein the second road user 1020 is now considered the most relevant road user, followed by the third road user 1030. This remains the same in the fourth prediction horizon 1040.

Figure 3E:
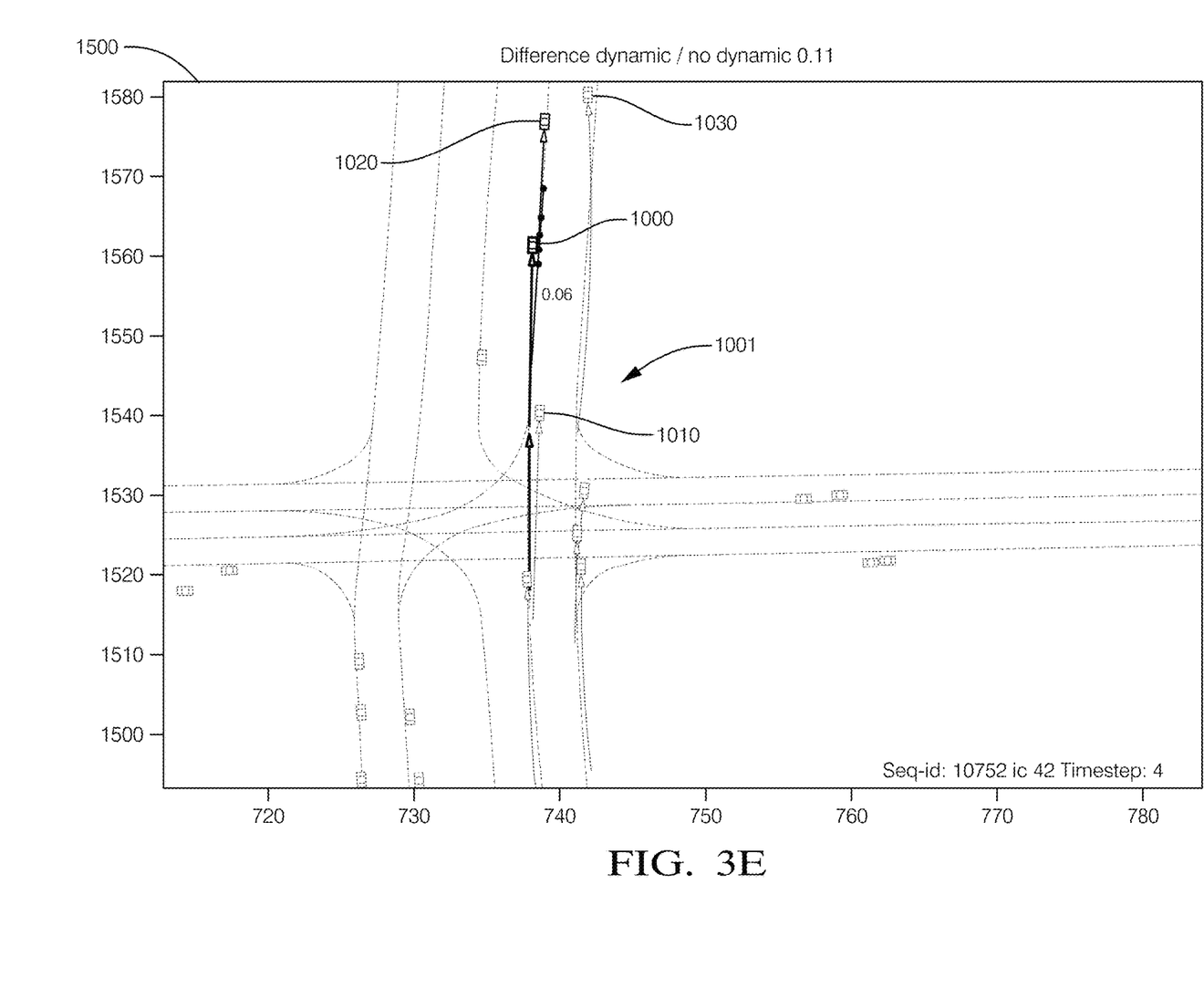
Figure 3F:
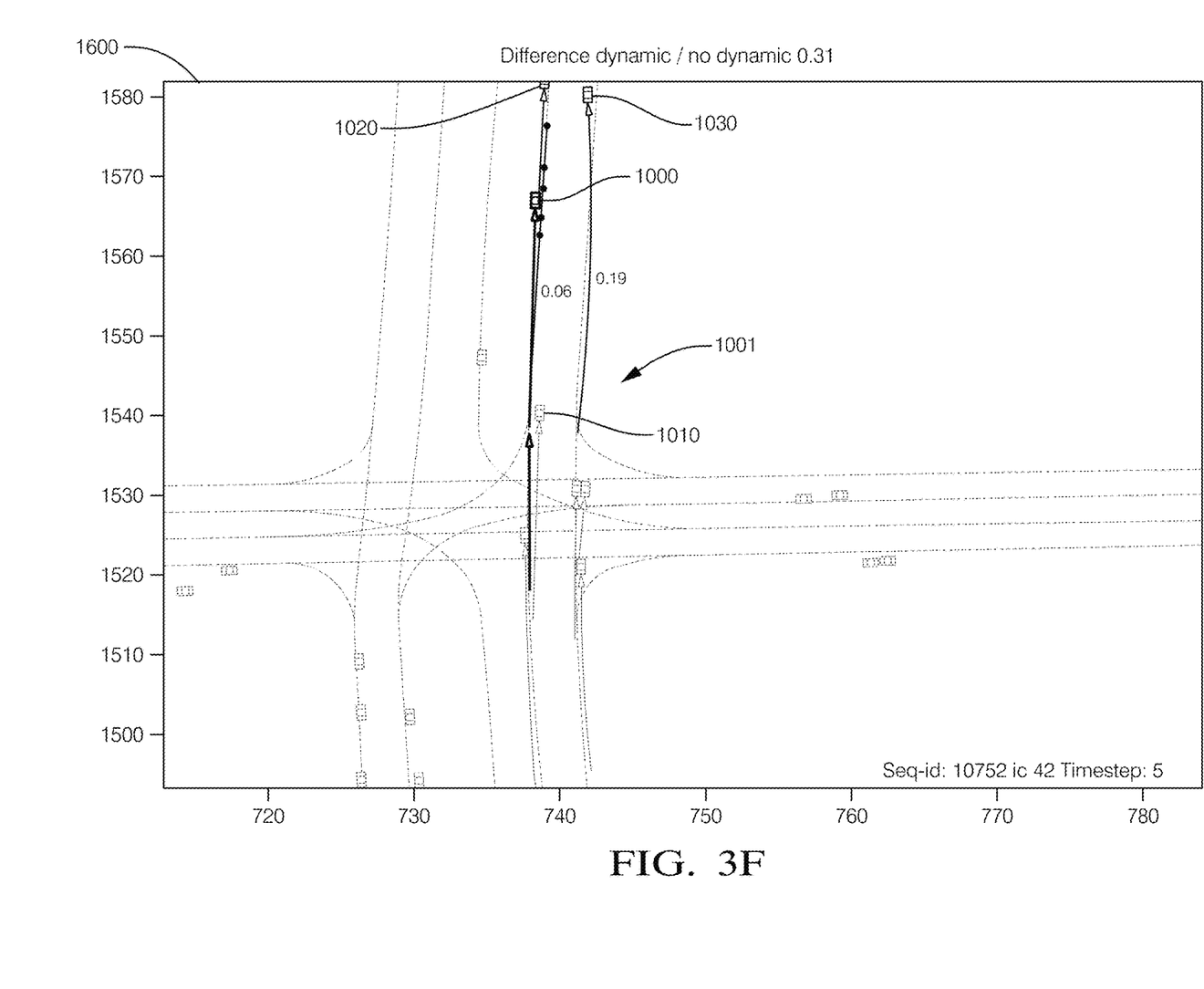

As can be seen from the fifth prediction horizon 1050, now the second road user 1020 is considered the only relevant road user. In the sixth prediction horizon 1060, however, the third road user becomes relevant again, however, with a much lower relevance.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

REFERENCE NUMERAL LIST 10 processor
20 memory
30 odometry sensor
40 image sensor
100 system
200 method
210 method step
220 method step
230 method step
240 method step
250 method step
260 method step
265 method step
270 method step
280 method step
290 method step
295 method step
1000 vehicle
1001 intersection
1010 first road user
1020 second road user
1030 third road user
1040 fourth road user
1100 first prediction horizon
1200 second prediction horizon
1300 third prediction horizon
1400 fourth prediction horizon
1500 fifth prediction horizon
1600 sixth prediction horizon

What is claimed is:

1. A method comprising:
obtaining, by a processor, vehicle state information, the vehicle state information comprising dynamic information regarding a vehicle;
predicting, by the processor, a first trajectory of the vehicle based on the vehicle state information for a first prediction time horizon;
detecting, by a sensor of the vehicle, road users in a vicinity of the vehicle, the road users including a first road user;
determining state information from the detected road users, including first road user state information for the first road user, the state information comprising dynamic information regarding the road users;
predicting, by the processor, a second trajectory of the vehicle based on the vehicle state information and the road users state information for the first prediction time horizon;
predicting, by the processor, a third trajectory of the vehicle based on the first road user state information and the vehicle state information for the first prediction time horizon;

performing, by the processor, a first similarity comparison of the first predicted trajectory and the second predicted trajectory of the vehicle to determine whether the detected road users are a potential target of the vehicle for the first prediction time horizon and to determine a relevance threshold of the detected road users for the first prediction time horizon;

performing, by the processor, a second similarity comparison of the second predicted trajectory and the third predicted trajectory to determine whether the first road user is a potential target of the vehicle for the first prediction time horizon based on the relevance threshold; and controlling, by the processor, at least one of an adaptive cruise control (ACC) system of the vehicle, an automatic emergency braking (AEB) system of the vehicle, or autonomous driving of the vehicle in response to determining that at least one of the detected road users is a potential target of the vehicle for the first prediction time horizon.

2. The method according to claim 1, wherein the dynamic information comprises information regarding at least one of:
a position of the vehicle;
a steering angle of the vehicle;
a throttle input of the vehicle;
a brake input of the vehicle;
an acceleration of the vehicle;
a velocity of the vehicle;
a turning signal status of the vehicle;
an autonomous driving feature status; or
a navigation route of the vehicle.

3. The method according to claim 1, wherein the vehicle state information further comprises static information regarding the vehicle.

4. The method according to claim 1,
wherein the state information from road users comprises state information from a second road user, and
wherein the method further comprises:
predicting, by the processor, a fourth trajectory of the vehicle based on the second road user state information and the vehicle state information for the first prediction time horizon; and
performing, by the processor, a third similarity comparison of the second predicted trajectory and the fourth predicted trajectory to determine whether the second road user is a potential target of the vehicle for the first prediction time horizon based on the relevance threshold.

5. The method according to claim 4, further comprising: determining whether the first road user or the second road user has a higher priority based on the second similarity comparison and the third similarity comparison.

6. The method according to claim 1, wherein the steps of the method are repeated for a second prediction time horizon different from the first prediction time horizon.

7. The method according to claim 1, wherein the first similarity comparison comprises performing a distance metric.

8. The method according to claim 7, wherein the distance metric comprises at least one of:
performing a Wasserstein algorithm;
performing an L1 algorithm;
performing an L2 algorithm; or
performing an Mahalanobis algorithm.

9. The method according to claim 1, wherein the prediction is performed by using a machine-learning algorithm.

10. A computer system comprising:
a processor; and
a sensor,
the computer system configured to:
obtain, by the processor, vehicle state information, the vehicle state information comprising dynamic information regarding a vehicle;
predict, by the processor, a first trajectory of the vehicle based on the vehicle state information for a first prediction time horizon;
detect, by the sensor, road users in a vicinity of the vehicle, the road users including a first road user;
determine state information from the detected road users, including first road user state information for the first road user, the state information comprising dynamic information regarding the road users;
predict, by the processor, a second trajectory of the vehicle based on the vehicle state information and the road users state information for the first prediction time horizon;
predict, by the processor, a third trajectory of the vehicle based on the first road user state information and the vehicle state information for the first prediction time horizon;
perform, by the processor, a first similarity comparison of the first predicted trajectory and the second predicted trajectory of the vehicle to determine whether the detected road users are a potential target of the vehicle for the first prediction time horizon and to determine a relevance threshold of the detected road users for the first prediction time horizon;
perform, by the processor, a second similarity comparison of the second predicted trajectory and the third predicted trajectory to determine whether the first road user is a potential target of the vehicle for the first prediction time horizon based on the relevance threshold; and
control, by the processor, at least one of an adaptive cruise control (ACC) system of the vehicle, an automatic emergency braking (AEB) system of the vehicle, or autonomous driving of the vehicle in response to determining that at least one of the detected road users is a potential target of the vehicle for the first prediction time horizon.

11. A non-transitory computer readable medium comprising instructions that when executed by a computer cause the computer to perform a method for target selection in a vicinity of a vehicle, the method comprising:
obtaining, by a processor, vehicle state information, the vehicle state information comprising dynamic information regarding the vehicle;
predicting, by the processor, a first trajectory of the vehicle based on the vehicle state information for a first prediction time horizon;
detecting, by a sensor of the vehicle, road users in a vicinity of the vehicle, the road users including a first road user;
determining state information from the detected road users, including first road user state information for the first road user, the state information comprising dynamic information regarding the road users;
predicting, by the processor, a second trajectory of the vehicle based on the vehicle state information and the road users state information for the first prediction time horizon;
performing, by the processor, a first similarity comparison of the first predicted trajectory and the second predicted trajectory of the vehicle to determine whether the detected road users are a potential target of the vehicle for the first prediction time horizon and to determine a relevance threshold of the detected road users for the first prediction time horizon;

performing, by the processor, a second similarity comparison of the second predicted trajectory and the third predicted trajectory to determine whether the first road user is a potential target of the vehicle for the first prediction time horizon based on the relevance threshold; and controlling, by the processor, at least one of an adaptive cruise control (ACC) system of the vehicle, an automatic emergency braking (AEB) system of the vehicle, or autonomous driving of the vehicle in response to determining that at least one of the detected road users is a potential target of the vehicle for the first prediction time horizon.

12. The computer system of claim 10, further comprising: a vehicle.

13. The method according to claim 1, further comprising:
issuing, by the processor, a warning to a driver of the vehicle in response to determining that the detected road users are a potential target of the vehicle for the first prediction time horizon.

14. The computer system of claim 10, wherein the computer system is further configured to:
issue, by the processor, a warning to a driver of the vehicle in response to determining that the detected road users are a potential target of the vehicle for the first prediction time horizon.

15. The non-transitory computer readable medium of claim 11, wherein the method further comprises:
issuing, by the processor, a warning to a driver of the vehicle in response to determining that the detected road users are a potential target of the vehicle for the first prediction time horizon.

* * * * *